US011045768B2

(12) United States Patent
Tomescu

(10) Patent No.: US 11,045,768 B2
(45) Date of Patent: Jun. 29, 2021

(54) METHOD OF OPERATING MEMBRANE FILTER

(71) Applicant: FIBRACAST LTD., Hannon (CA)

(72) Inventor: Ionel John Tomescu, Ancaster (CA)

(73) Assignee: FIBRACAST LTD., Hannon (CA)

( * ) Notice: Subject to any disclaimer, the term of this patent is extended or adjusted under 35 U.S.C. 154(b) by 597 days.

(21) Appl. No.: 15/274,520

(22) Filed: Sep. 23, 2016

(65) Prior Publication Data

US 2017/0095773 A1    Apr. 6, 2017

Related U.S. Application Data

(60) Provisional application No. 62/232,018, filed on Sep. 24, 2015.

(51) Int. Cl.
*B01D 65/02* (2006.01)
*B01D 65/08* (2006.01)
(Continued)

(52) U.S. Cl.
CPC ........... *B01D 65/02* (2013.01); *B01D 61/145* (2013.01); *B01D 61/147* (2013.01); *B01D 61/40* (2013.01);
(Continued)

(58) Field of Classification Search
CPC ...... B01D 65/02; B01D 65/08; B01D 61/145; B01D 63/082; B01D 61/147; B01D 61/40;
(Continued)

(56) References Cited

U.S. PATENT DOCUMENTS 2,415,048 A * 1/1947 Sharp ................... B01F 3/04255
261/124
2,917,295 A * 12/1959 Hauer ................ B01F 3/04262
261/124
(Continued)

FOREIGN PATENT DOCUMENTS

WO      0013767 A1    3/2000
WO   2007006153 A1    1/2007
(Continued)

OTHER PUBLICATIONS

Definition of "horizontal section", Merriam Webster Online Dictionary, Accessed Apr. 23, 2020, pp. 1-5. (Year: 2020).*
(Continued)

*Primary Examiner* — David C Mellon
(74) *Attorney, Agent, or Firm* — Borden Ladner Gervais LLP; Michael Damiani

(57) ABSTRACT

A method of operating an immersed microporous membrane module includes a step of monitoring membrane performance to sense the onset of sludging in the module. Differences in permeability between permeation in backwashes, or trends in permeability during backwashing and permeability during permeation, or both, are monitored. Solid deposits formed during the onset of sludging may be removed with an in situ de-sludging process. For example, the deposits may be removed by stopping permeation while aerating the module, optionally at an increased rate. At other times, the module is optionally aerated while permeate is withdrawn at an aeration rate correlated to flux. The method may be used in particular with a membrane module having parallel textured flat sheet membranes suspended between a pair of vertically oriented headers. An aerator may be made from an open bottomed channel having an array of holes rising and concentrated towards the center of the channel.

17 Claims, 8 Drawing Sheets

(51) Int. Cl.
   *B01D 61/40* (2006.01)
   *B01D 63/08* (2006.01)
   *B01D 61/14* (2006.01)
   *B01D 69/06* (2006.01)

(52) U.S. Cl.
   CPC ............ *B01D 63/082* (2013.01); *B01D 65/08* (2013.01); *B01D 69/06* (2013.01); *B01D 2311/14* (2013.01); *B01D 2313/125* (2013.01); *B01D 2313/26* (2013.01); *B01D 2315/06* (2013.01); *B01D 2321/04* (2013.01); *B01D 2321/185* (2013.01); *B01D 2325/08* (2013.01)

(58) Field of Classification Search
   CPC ............ B01D 69/06; B01D 2311/14; B01D 2313/26; B01D 2321/04; B01D 2315/06; B01D 2321/185; B01D 2325/08; B01D 2313/125; B01D 61/08; B01D 61/10; B01D 61/18; B01D 61/20; B01D 63/02; B01D 63/04; B01D 63/043; B01D 63/06; B01D 2311/2661; B01D 2311/2665; B01D 2313/10; B01D 2313/105; B01D 2315/20; B01D 2321/18; C02F 3/06; C02F 3/102; C02F 3/1268; C02F 3/1273; C02F 3/1278; C02F 3/1284; C02F 3/20; C02F 3/201; C02F 3/208; C02F 3/22; C02F 1/44; C02F 1/441; C02F 1/442; C02F 1/444; C02F 1/72; C02F 1/727; C02F 1/74; B01F 3/04099; B01F 3/04106; B01F 3/04113; B01F 3/0412; B01F 3/04241; B01F 3/04248; B01F 3/04262; B01F 2003/04118; B01F 2003/04184; B01F 2003/04191; B01F 2003/04283; B01F 2003/04319
   See application file for complete search history.

(56) References Cited

U.S. PATENT DOCUMENTS

| | | | | |
|---|---|---|---|---|
| 3,294,380 | A | * | 12/1966 | Born .................... B01F 3/04241 |
| | | | | 261/121.1 |
| 3,608,834 | A | * | 9/1971 | MacLaren ........... B01F 3/04255 |
| | | | | 239/571 |
| 3,997,634 | A | * | 12/1976 | Downs ................. B01F 3/0412 |
| | | | | 261/122.2 |
| 4,861,472 | A | * | 8/1989 | Weis ...................... B01D 24/30 |
| | | | | 210/189 |
| 5,639,373 | A | | 6/1997 | Mahendran et al. |
| 5,944,997 | A | * | 8/1999 | Pedersen ................ B01D 61/18 |
| | | | | 210/195.2 |
| 6,287,467 | B1 | | 9/2001 | Nagano et al. |
| 2007/0261554 | A1 | * | 11/2007 | Jensvold ................ B01D 53/22 |
| | | | | 96/8 |
| 2009/0101569 | A1 | * | 4/2009 | Yoshida ................. B01D 29/39 |
| | | | | 210/411 |

FOREIGN PATENT DOCUMENTS

| | | |
|---|---|---|
| WO | 2007079540 A1 | 7/2007 |
| WO | 2011130853 A1 | 10/2011 |
| WO | 2013056373 A1 | 4/2013 |

OTHER PUBLICATIONS

International Patent Application No. PCT/CA2016/051118, International Search Report and Written Opinion dated Dec. 19, 2016.
Liu, Xuefei et al., "CFD modelling of uneven flows behaviour in flat-sheet membrane bioreactors: From bubble generation to shear stress distribution", Journal of Membrane Science 570-571 (2019) 146-155.

\* cited by examiner

METHOD OF OPERATING MEMBRANE FILTER

RELATED APPLICATIONS

This application claims the benefit of U.S. Provisional Application Ser. No. 62/232,018, filed on Sep. 24, 2015, which is incorporated herein by reference.

FIELD

This invention relates to immersed membrane filters and methods of operating them.

BACKGROUND

Immersed membranes are typically in the form of flat sheets or hollow fibers. Typical applications include filtering surface water to produce drinking water and treating wastewater in a membrane bioreactor (MBR). In these applications, the membranes usually have pores in the microfiltration or ultrafiltration range. Some examples of hollow fiber modules are described in U.S. Pat. No. 5,639,373. Some examples of flat sheet modules are described in U.S. Pat. No. 6,287,467. In use, a module containing many membranes is immersed in an open tank of liquid to be filtered. Permeate is withdrawn by gravity, siphon or permeate pump connected to an inner surface of the membranes.

Immersed membranes, like most membrane systems, are prone to fouling of the membrane pores. Further, when filtering liquid with a high concentration of suspended solids, such as mixed liquor, pockets of dewatered sludge can form in parts of the membrane module. While fouling is local to the pores of a membrane, sludging is a much larger accumulation of solids spanning between multiple membranes in a module and interfering with the flow of fresh feed liquid into parts of the module. Areas of sludging can be, for example, more than 10 cm wide in at least one direction. Air bubbles are often provided below immersed modules to help inhibit fouling and sludging. However, sludging can still occur, particularly when process conditions change in a membrane bioreactor. Areas of significant sludging can expand over time despite continued aeration until the membrane module is removed from the tank for physical de-sludging.

INTRODUCTION

This specification describes a method of operating a membrane module. The method includes a step of monitoring membrane performance to sense the onset of sludging in the module. Optionally, the method also includes a step to de-sludge the module in situ (without removing the module from the tank) after detecting the onset of sludging. The method optionally also includes an aeration step to inhibit fouling, sludging, or both.

A monitoring step described in this specification involves monitoring a difference in membrane permeability between permeation and backwashing, or trends in membrane permeability during permeation and backwashing, or both. An increase in the difference, or a decrease in permeability during permeation without a corresponding decrease in permeability during backwashing, suggests that a sludge deposit is beginning to form in a module.

A de-sludging step described in this specification involves stopping permeation while aerating the module, and optionally increasing the aeration rate. The de-sludging step may also include circulating return activated sludge (RAS) through a tank containing the module. An aeration step described in this specification involves aerating the membranes at a rate correlated to flux or at a fluctuating rate.

This specification also describes a membrane module and an aerator. The module and aerator are believed to be particularly suitable for use with the process steps described above. The membrane module has parallel textured flat sheet membranes suspended between a pair of vertically oriented headers, or oriented with horizontal grooves, or both. The aerator is made from an open bottomed channel, which widens towards its bottom, and has an array of holes rising and concentrated towards the center of the channel or otherwise away from a supply of air.

DETAILED DESCRIPTION

Figure 1:
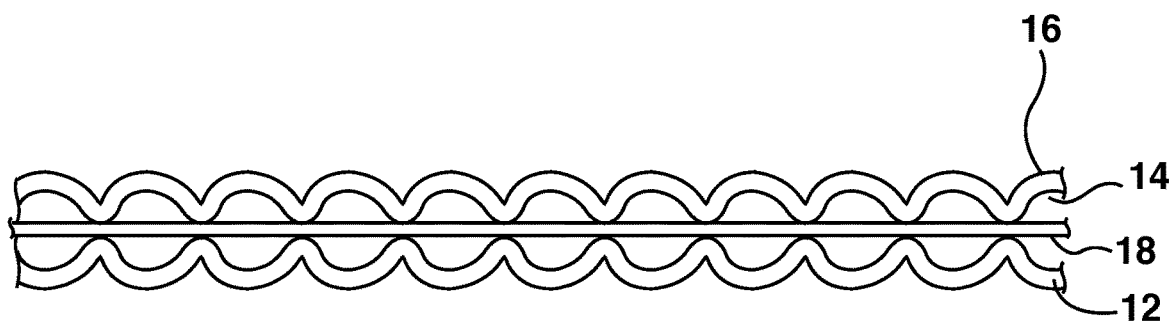
FIG. 1 shows an edge view of a membrane sheet.

FIG. 1 shows a membrane sheet 10. The membrane sheet 10 is made up of two substrate sheets 12 formed and bonded together to provide internal channels 14. The outsides of the substrate sheets 12 are coated with a porous separation layer 16. The separation layer 16 may be made by casting a membrane forming dope over the substrate sheets 12 and then curing the dope in a quench bath. This produces pores according to the non-solvent induced phase separation (NIPS) method, typically in the ultrafiltration or microfiltration range. A central sheet 18 between the two substrate sheets 12 is optional but may be added to provide a more rigid membrane sheet 10 if desired.

The example of a membrane sheet 10 shown has substrate sheets 12 made from non-woven polyethylene terephthalate (PET) sheets molded above their heat deflection temperature to provide free standing ridges. The separation layer 16 is a polyvinylidene fluoride (PVDF) based ultrafiltration (UF) membrane with a molecular weight cut off (MWCO) of about 100 kDalton. Its clean water permeability is about 25 gfd/psi @20C and 90 gfd flux.

Figure 2:
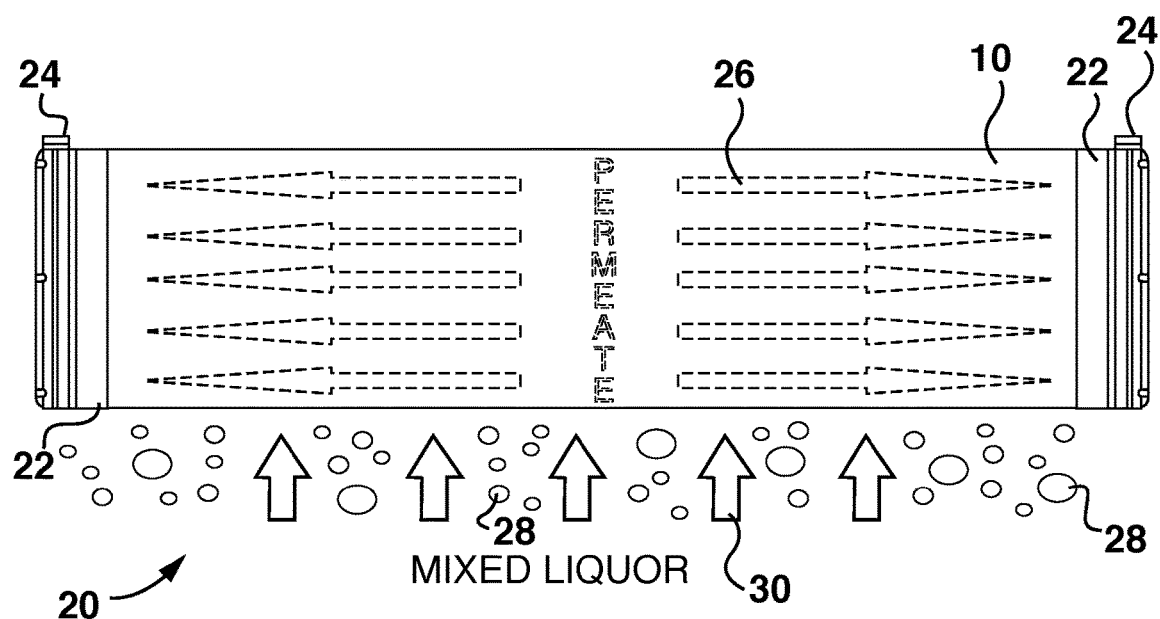
FIG. 2 shows an elevation view of a membrane module including a membrane sheet as in FIG. 1.

FIG. 2 shows a membrane module 20. The module 20 has one or more membrane sheets 10. The edges of the membrane sheets 10 that are open to the internal channels 14 (i.e. the edge shown in FIG. 1) are potted in headers 22, alternatively called potting heads or permeate collectors. When in use, the headers 22 are oriented generally vertically and the internal channels 14 are generally horizontal. Suction applied to permeate ports 24 of the headers 22 for example by pump or siphon causes permeate 26 to be produced in the internal channels 14 and flow through the headers 22. Optionally, permeate can be withdrawn from one or both ends of the membrane sheet 10. A module 20 typically has multiple parallel membrane sheets 10. Adjacent membrane sheets 10 are separated by vertical gaps of generally equal width. In one example, a module 20 is about 1900 mm wide, about 800 mm high and about 60 mm thick and contains 16 membrane sheets 10 spaced generally equally across its thickness. In this example, the headers 22 are polyvinyl chloride (PVC) moldings and the membrane sheets 10 are potted in the headers 22 with a thermosetting epoxy resin.

When used in a membrane bioreactor (MBR), a tank holding the module 20 is typically filled with mixed liquor according to an activated sludge process. The membrane module 20 and tank replaces the secondary clarifier. Bubbles 28 provided from below the module 20 help or cause mixed liquor 30 to flow upwards through the module 20, including through the gaps between adjacent membrane sheets 10. In another application, the module 20 may be used to filter surface water to provide potable water. In this case, the surface water may have a coagulant and/or flocculant added to it. Optionally, the module 20 may be immersed in water containing flocs.

Figure 3:
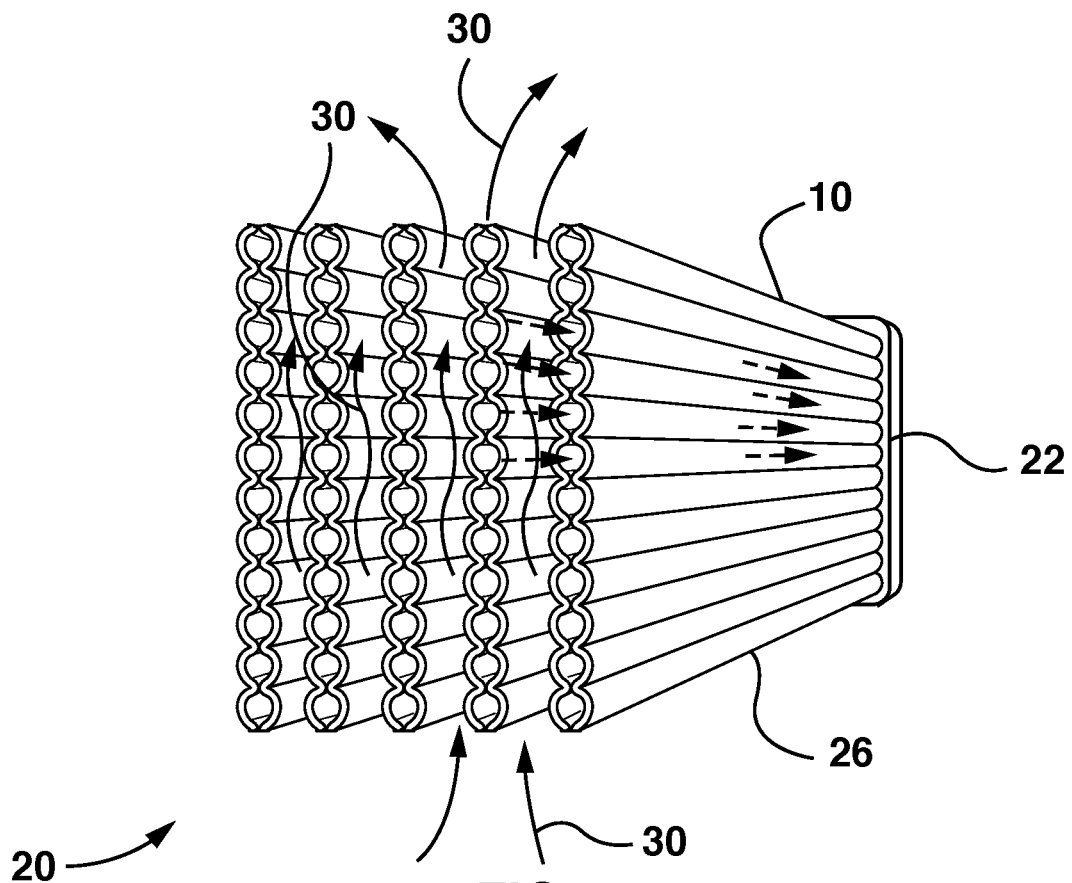
FIG. 3 is a schematic perspective view of a cut open module showing feed liquid and permeate flow directions.

FIG. 3 shows a schematic view of a module 20 cut open to further illustrate the flow of mixed liquor 30 (or another feed liquid) through the module 20. The undulating shape of the membrane sheets 10 creates turbulence in the mixed liquor 30 as it rises. The membrane sheets 10 vibrate as the mixed liquor 30 and bubbles 28 move between them. The bubbles 28 may provide some direct scouring of the membrane sheets 10 in addition to assisting or causing the mixed liquor flow.

The inventors believe that the undulating shape of the membrane sheets 10 helps to inhibit sludging by enhancing turbulence. The position of the headers 22 at the sides of the module 20 provides a generally unobstructed path for bubbles 28 and mixed liquor 30 to flow through the module 20. However, sludging can still occur under certain conditions. If sludging does occur, these features are also believed to help the module 20 to release sludge built up within the module 20.

Figure 4:
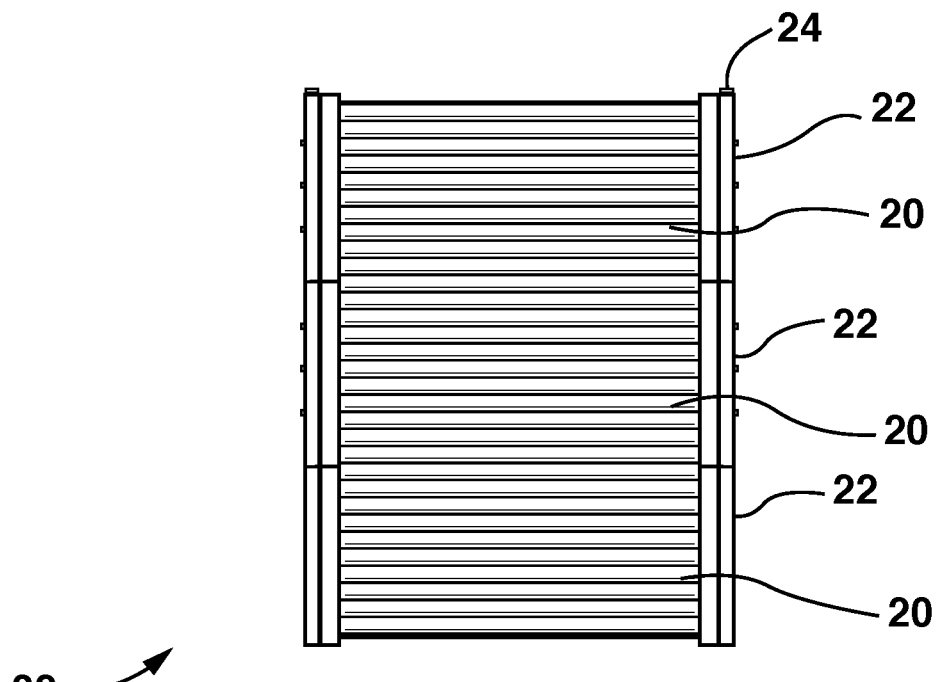
FIG. 4 shows an elevation view of three of the modules of FIG. 2 stacked together.

FIG. 4 shows a stack 32 of three modules 20. The modules 20 are stacked vertically on top of each other. The permeate ports 24 of a lower module fit into sockets (not visible) in the headers 22 of an upper module. The sockets in the lowest module 20 are plugged. The permeate ports 24 of the highest module can be connected to a permeate withdrawal pipe and used to withdraw permeate from all three modules 20. Stacks 32 may also be made with two, four or other numbers of modules 20. Since the headers 22 of adjacent modules are vertically aligned and continuous, feed liquid can flow vertically through the entire stack 32 without being impeded by the headers 22.

Figure 5:
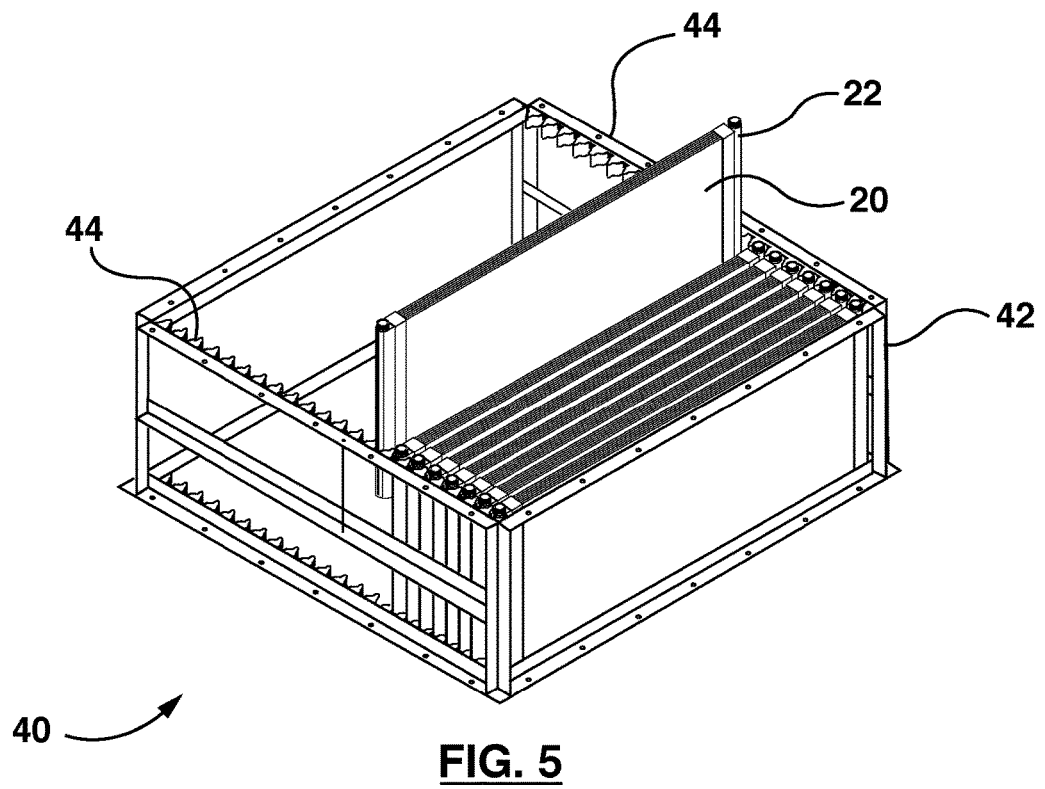
FIG. 5 is an isometric view of a block containing several of the modules of FIG. 2.

FIG. 5 shows a block 40 containing a plurality of modules 20 in a frame 42. The modules 20 are placed side by side in the frame 42. A module 20 may slide vertically into or out of the frame 42. When in the frame 42, the headers 22 of the module 20 fit into corresponding slots 44 provided, in the example shown, by plastic moldings attached to the frame 42. The frame 42 is preferably made of stainless steel, although other materials may also be used.

Figure 6:
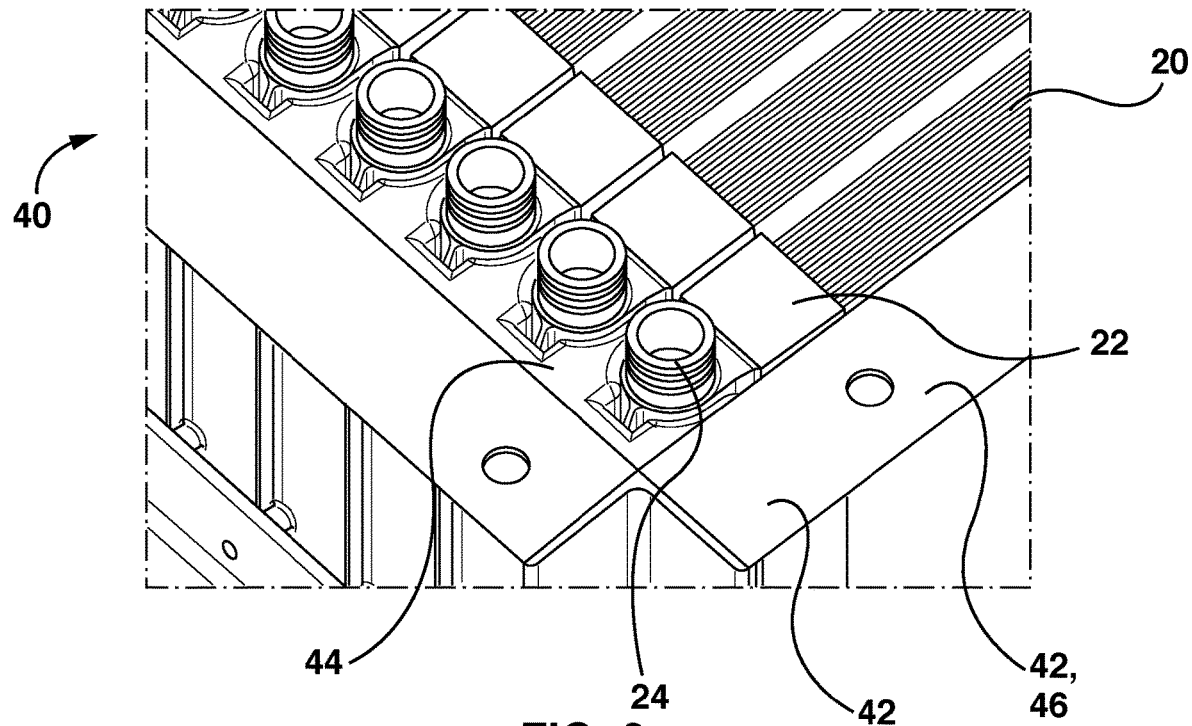
FIG. 6 is an enlarged view of part of the block of FIG. 5.

FIG. 6 shows an enlarged view of the top of a block 40. A flange 46 at the top of the block 40 and a similar flange (not shown in FIG. 6) on the bottom of the block 40 can be used to support an upper or lower block 40 and to allow blocks 40 in a stack to be fastened together. The permeate ports 24 of the modules 20 protrude above the flange 46 to allow for permeate connection between modules 20 in a stack as described in FIG. 4.

Figure 7:
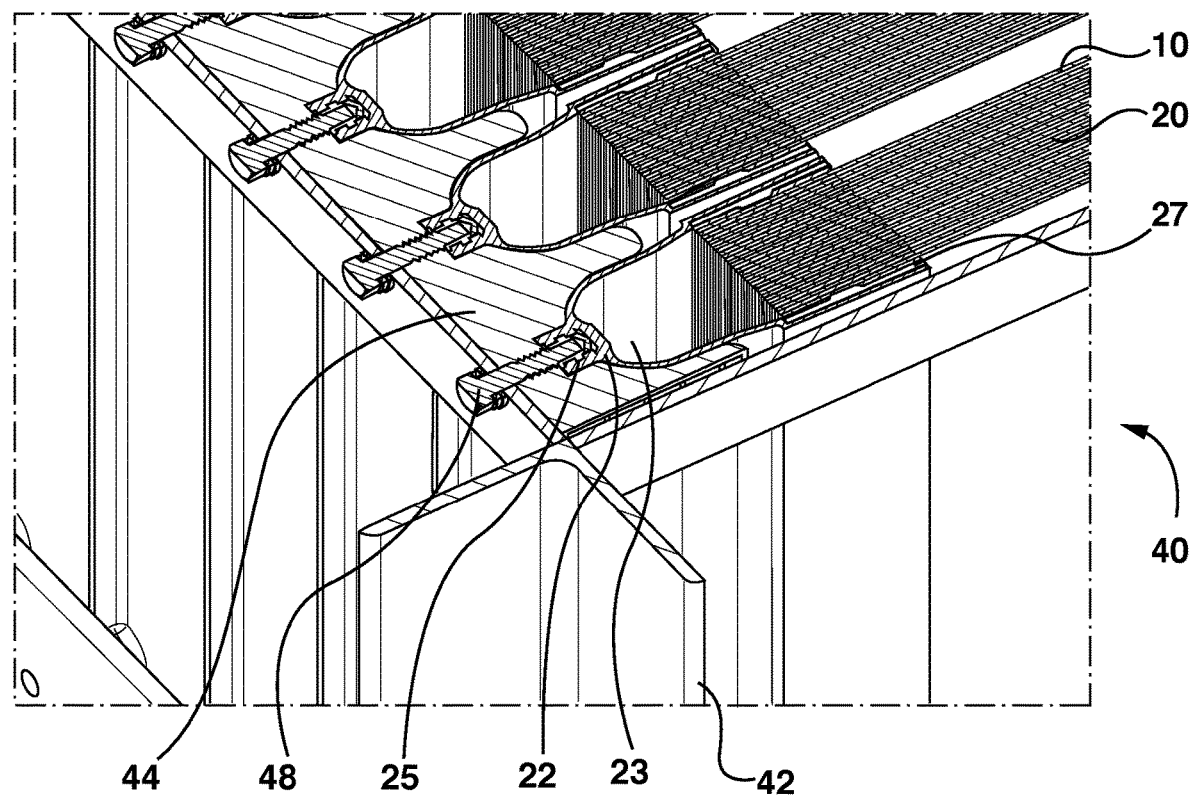
FIG. 7 is an enlarged view of a section of the block of FIG. 6.

FIG. 7 shows an enlarged view of a horizontal section of part of the block 40. The header 22 contains a permeate chamber 23 defined by the header 22, the edges of the membrane sheets 10 and the potting resin 27 between the membrane sheets 10. The permeate chamber 23 is in fluid communication with the permeate ports 24 and sockets. To hold a module 20 in the frame 42, a bolt 48 passes through the frame 42 and is threaded into a nut 25 adhered to the header 22, or molded integrally with the plastic molded header 22 as shown.

Figure 8:
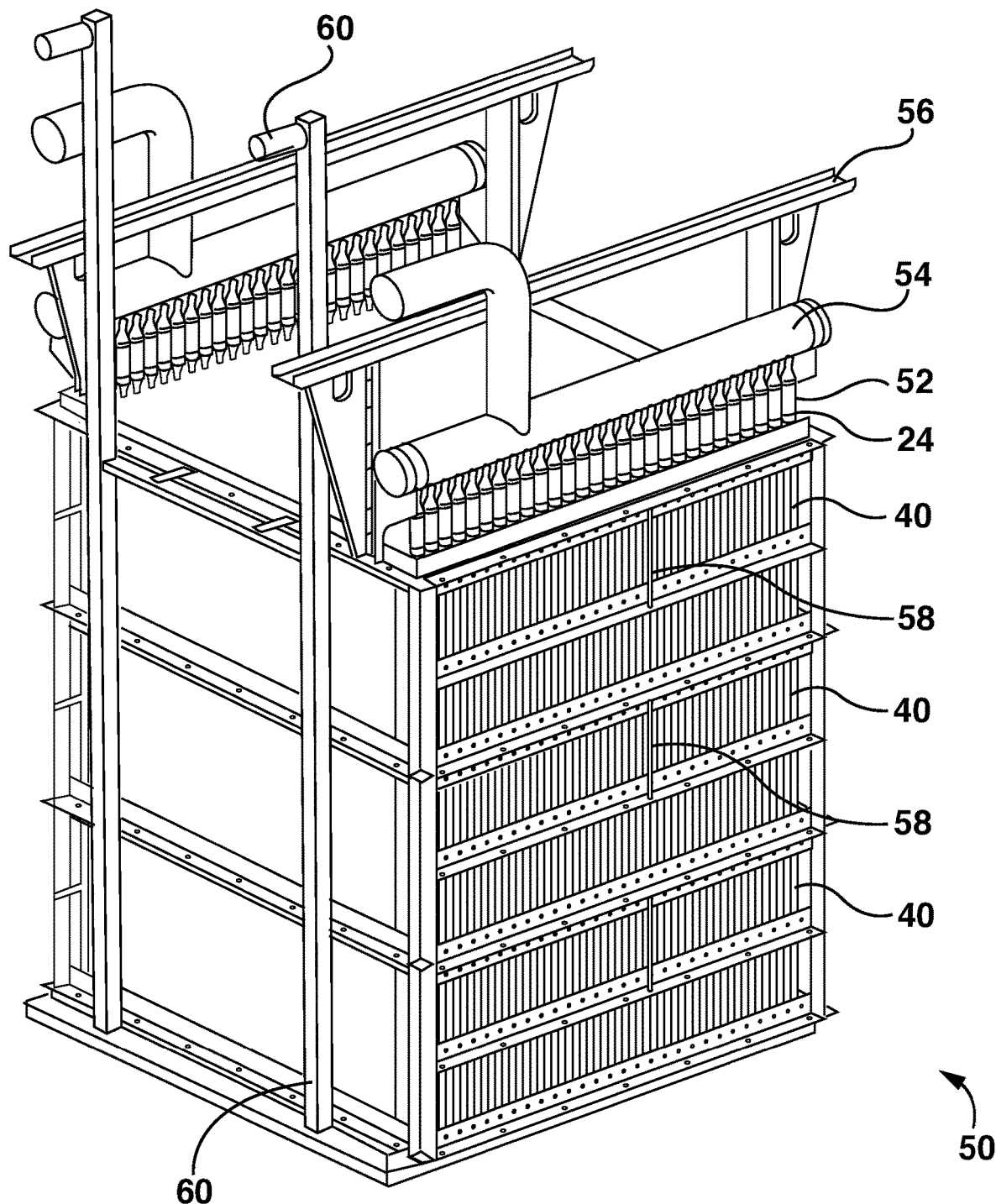
FIG. 8 is an isometric view of a cassette having three of the blocks of FIG. 5 stacked together.

FIG. 8 shows a cassette 50 made up of three blocks 40 stacked vertically together, one on top of the other. Optionally, a cassette 50 made have one, two, four or another number of bocks 40. The permeate ports 24 of the upper block 40 are connected to a permeate header pipe 54, optionally through connector pipes 52 as shown. The frames 42 of the blocks 40 are connected to each other by struts 58 that, in the example shown, are threaded rods with nuts on their ends. Struts 58 also attach the upper block 40 to a cassette frame 56, which may be used to hang the cassette 50 in a tank. Air supply pipes 60 bring air to the bottom of the cassette to be fed to a set of aerators (not visible) under the lowest block 40.

Figure 9:
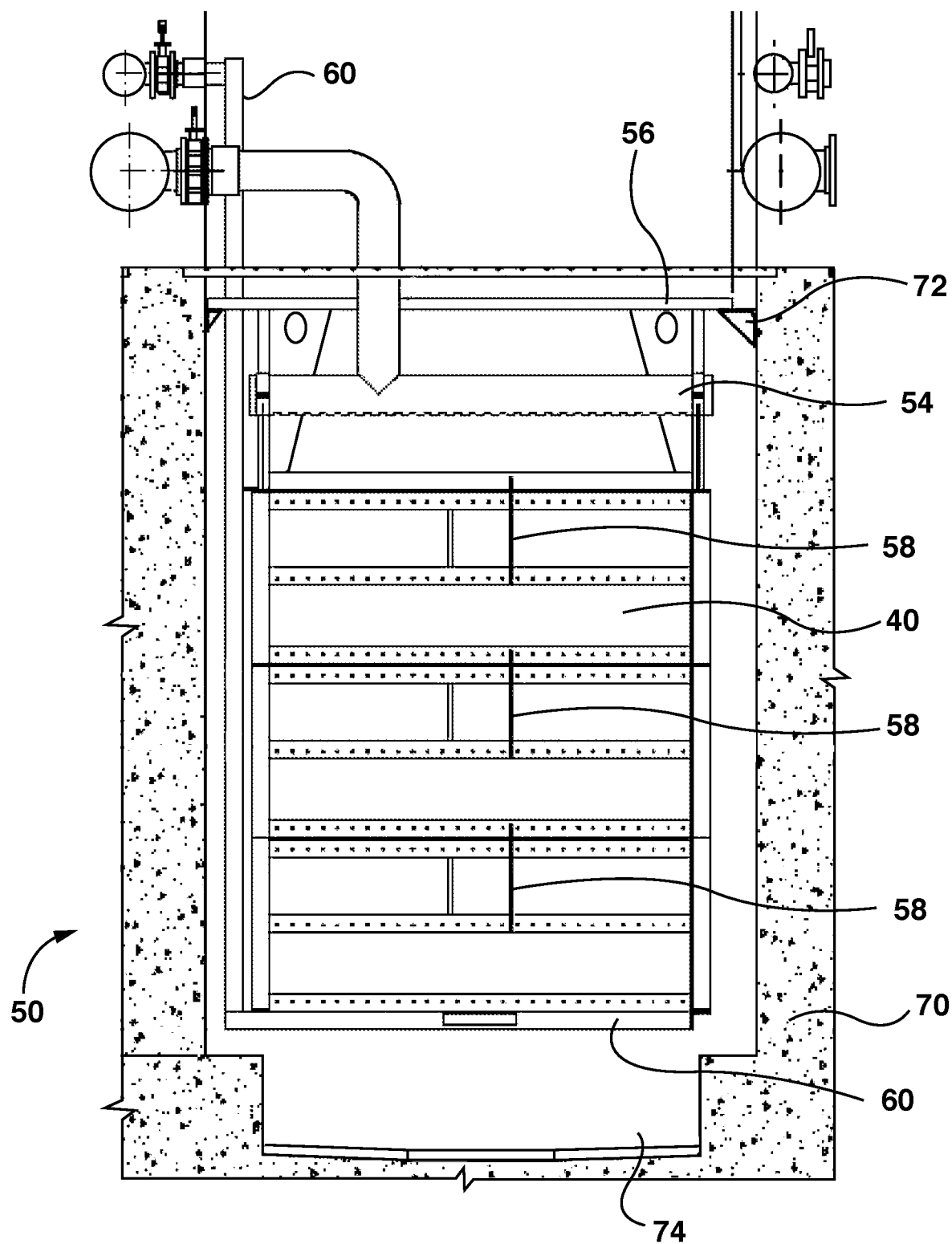
FIG. 9 is a section in elevation view of the cassette of FIG. 8 in a tank.

FIG. 9 shows a cassette 50 installed in a tank 70. The tank 70 shown is a concrete tank cast in the ground. Optionally, tanks made of metal, plastic or other materials, in or above the ground, may be used. The cassette frame 56 rests on the walls of the tank 70, in particular on ledges 72 attached to the tank 70 in the example shown. The cassette 50 can be lowered into the tank 70, or lifted out of the tank 70, by a crane or hoist attached to the cassette frame 56. Adjustable plates (not shown) may be added to the ledges 70 or cassette from 56 to allow the cassette 50 to be leveled in the tank 70. Alternatively, the cassette 50 can rest on the bottom of the tank 70, or the cassette 50 can be attached to a frame or other structure that rests on the bottom of tank 70.

The tank 70 preferably surrounds the cassette 50 closely as shown. Mixed liquor (or other feed liquid) is preferably fed into a channel 74 at the bottom of the tank 70 from one end of the tank and exits from a weir (not shown) at the top of the opposite end of the tank 70. This arrangement provides an average upwards flow of feed liquid through the modules 20. Multiple cassettes 50 can be spaced along the length of the tank 70 and combined to make a membrane train. A complete membrane system may have one or more trains.

The air supply pipes 60 extend horizontally below the cassette 50. The horizontal part of each air supply pipe 60 has a series of holes, one located below each vertical stack of 1-5 modules 20. A plurality of aerators 80 (not visible in FIG. 9 but shown in FIGS. 10 and 11), preferably one for each vertical stack of modules 20, are attached to the frame 42 of the lowest block 40 and extend across the bottom of the cassette 50 perpendicular to and above the horizontal parts of the air supply pipes 60. The aerators 80 are open bottomed channels and receive air that rises upwards from holes in the air supply pipes 60 below them. The aerators 80 are parallel to the modules 20. In the example shown, the cassette 50 has 84 modules 20. The packing density by volume is 450-500 m2/m3. Packing density by footprint is about 850 m2/m3. In one example, each module 20 is about 7-10 cm wide. The modules 20 may be arranged in a vertical stack from 1 to 5 modules 20 high in a cassette 50. Each stack of modules 20 in the cassette 50 has one aerator 80 about 3-6 cm wide below the lowest module 20 in the stack.

Figure 10:
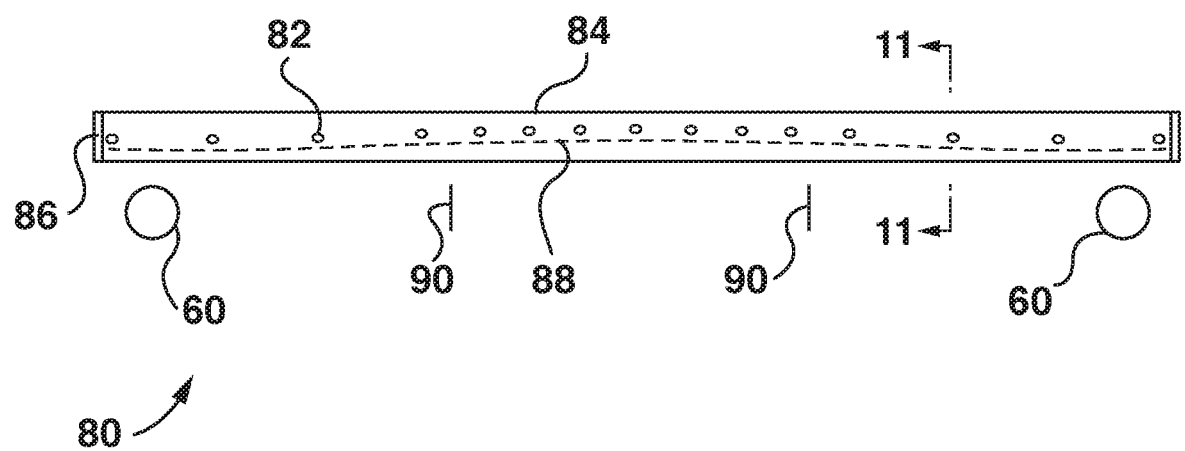
FIG. 10 is an elevation view of an aerator.
Figure 11:
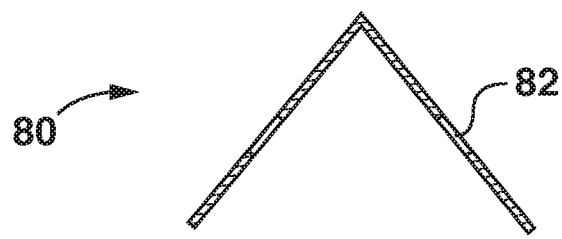
FIG. 11 is a cross section of the aerator of FIG. 10.

FIGS. 10 and 11 show an aerator 80. The aerator 80 shown is made from a stainless steel plate bent to form a prismatic open bottomed channel. The aerator 80 may have a simple triangular shape as shown in FIG. 11 or another shape. Holes 82 in the aerator 80 produce bubbles when the aerator 80 is in use. Preferably, bubbles are provided essentially continuously, but optionally at a varying rate, while permeate is withdrawn from the modules 20 and during backwashing or relaxation periods. In the cassette 50 of FIG. 8, there is one aerator 80 per module of the lowest block 40. Each aerator 80 is general parallel to and directly below its corresponding module 20.

In use, the aerator 80 receives air (or another gas) rising upwards from the air supply pipes 60. End plates 86 prevent air from escaping from the ends of the aerator 80. The holes 82 may be, for example, between 3 mm and 8 mm in diameter and produce medium size bubbles of about 5 to 10 mm in diameter. With air fed from air supply pipes 60 near the ends of the aerator 80, an air-water interface 88 within the aerator tends to rise towards the center of the aerator 80. The holes 82 may similarly rise away from the source of the air, in this case towards the center of the aerator 80. The middle third of the aerator 80 shown, indicated by the section between the two lines 90 in FIG. 10, preferably contains more holes 82 per unit length of aerator 80 than either of the outer thirds. Alternatively, the holes 82 may be arranged differently, but still providing an uneven distribution of holes 82 along the length of the aerator 82, preferably with an increased density of holes away from the air supply pipes 60. For example, in an alternative cassette 50 with a single air supply pipe 60 near the center of the cassette 50, the two outer thirds or quarters of the aerator 82 may contain more holes 82 per unit length of aerator 80 than the middle third or half. However, a centrally concentrated arrangement of holes 82 is preferred. The uneven distribution of holes 82 produces a generally even distribution of air across the length of a module 20. However, if desired, the holes 82 can also be arranged to bias the air towards the ends of a module 20 or the center of a module 20.

Additional information describing suitable membrane sheets, modules, bocks and cassettes can be found in International Publication Number WO 2013/056373, Coating Device and Process for Coating Formed Sheet Membrane Element by Fibracast Ltd. published on Apr. 25, 2013 and International Publication Number WO 2011/130853, Formed Sheet Membrane Element and Filtration System by Fibracast Ltd. published on Oct. 27, 2011, which are incorporated herein by reference.

When a module 20 is operating, bubbles released from the aerators 80 pass between membrane sheets 10. The primary purpose of the bubbles is to vibrate the membrane sheets 10. However, the bubbles may also directly scour the membrane sheets and cause feed liquid to rise through the modules 20. The rising feed liquid further scours and vibrates the membranes sheets 10, and also renews and de-concentrates the feed liquid between membrane sheets 10. A higher air flow rate generally causes an increased rate of feed liquid flow through the module 20, increased membrane sheet vibration 10, and increased scouring of the membrane surface. One or more of these effects is believed to discourage sludge buildup in the modules 20, for example by discouraging membrane sheets 10 from touching each other for extended periods of time.

While a plant is operating, the influent feed rate may vary causing the required total permeate production rate and membrane flux to also vary. Further, a plant operator may choose to, or be required to, take a membrane train out of production temporarily and to compensate for the lost production by increasing the flux of the remaining trains. In an aeration regime, the rate of air supplied to a module 20 is increased with increasing flux and decreased with decreasing flux. A table or formula correlating average air flow rate to flux can be developed by operating at a series of flux values and recording the air flow rate that provides stable transmembrane pressure (TMP) at each flux. In experiments with modules 20 as described above in one MBR, the TMP was stable a flux of 16 GFD flux at 10° C. when air was supplied at 0.0086 SCFM/ft2 of membrane surface area. Maintaining a stable TMP at 17 GFD flux at 10° C. required 0.010 SCFM/ft2 of membrane surface area. In other examples, more or less air might be required but the required average air flow rate typically increases with flux.

Preferably, low-pressure positive displacement air blowers driven by a variable frequency drive are used to supply air to the aerators 80. The air flow rate may be varied by altering the blower speed. The air-flow rate may be varied to provide a higher or lower average air flow rate. The air flow rate may also be varied to provide a continuously variable flow rate, varying around a specified average flow rate. In another mode of operation, a controller can provide a random variation in air flow rate, varying around a specified average flow rate. In the case of centrifugal blowers, the air flow rate may be varied by modulating a valve in the intake or outlet of the blower. Air flow rate can also be varied by turning one or more blowers in a set of blowers on or off.

In a permeation regime, discrete periods of permeation are separated by backwashing events, alternatively called backpulsing. Backwashing is done at between 25% and 125% of the permeation flux preceding the backwashing event. Preferably, backwashing is done at not more than the flux in the permeation interval preceding the backwashing event, for example at between 25% and 75% of the permeation flux in the preceding interval.

Although the total permeate production, and therefore flux, required of a module 20 can vary in time, the flux is often stable over periods of time including several permeation intervals and backwashing events. In the event that flux does change, permeation intervals and backwashing events before and after the flux change can be scaled to each other or otherwise mathematically normalized to permit monitoring and control methods, to be described further below, to continue across a flux change.

A control system monitors the trans-membrane pressure (TMP) across a module 20 (or larger or smaller grouping of membrane sheets 10). TMP can be calculated by comparing the reading from a pressure sensor on the permeate side of the module 20 to the static head of water at the same elevation on the feed side of the module 20 and making an allowance for head loss in the permeate piping between the module 20 and pressure sensor. Typically, a pressure-indicating transmitter sends a signal indicating the measured pressure to a programmable logic control (PLC) or other data logging, computing or control device. According to a control or detection method, the operator is able, or the PLC is programmed to be able, to detect when the membrane is being fouled, or when the membrane is being sludged, or both.

Sludging of the membranes involves solids accumulating on the outside of the membrane surface over multiple permeation intervals. This can follow concentration polarization but the distinguishing feature of sludging is that the amount of solids still present after backwashing (or another cleaning procedure such as relaxation or increased aeration, or a combination of backwashing or relaxation with increased aeration) increases from one permeation interval to the next. Thus sludging indicates a failure of the regular cleaning procedure to substantially disperse or dilute the concentration polarization layer on the surface of the membrane or in the pores such that solids are deposited the surface of the membranes between permeation intervals. If left un-corrected, a thick layer of solids will accumulate and may dewater, usually in a certain portion of the membrane sheet 10, eventually blocking the filtration area of the membrane in the region of the sludging.

Membrane fouling, when discussed in general, can include sludging and solids accumulation on the surface of the membranes. However, in discussing the control method below, the word fouling is used to refer primarily to other permeability-reducing phenomenon such solids entering the pores of the membranes or chemical scaling, bonding or precipitation. Both of fouling and sludging reduce the performance of the membranes but require different processes to remove them.

In general, the TMP of one or more membrane sheets 10 is monitored over a series of permeation intervals each separated by a cake layer removing procedure. In the further description below, the membrane sheets 10 will be described as a module 20, although larger or smaller (typically larger) groups of membrane sheets 10 may be controlled as one unit. Also in the further description below, the cake layer removing procedure will be a backwash although a different cake layer removing procedure could be used. Also in the further description below, the monitoring (and other process steps) will be described as implemented by a PLC although the operator or another control device could be used.

In a monitoring method, a material increase in TMP during permeation over time without a material increase in TMP during backwashing, or that the rate of increase in TMP during permeation exceeds the rate of increase in TMP during backwashing, indicates sludging. In contrast, a material increase in TMP during backwashing over time, or that the rate of increase in TMP during permeation is near the rate of increase in TMP during backwashing, indicates fouling. In a control method, when sludging is detected a de-sludging procedure is implemented. Optionally, when fouling is detected, a de-fouling procedure is implemented. In analyzing TMP differences as described herein, the absolute values of TMPs are compared such that the calculated difference ignores the change in direction of water flow between backwashing and permeate production. Preferably, a turbidity meter or other indicator of membrane integrity is also monitored to verify that a change in TMP is not the result of a broken membrane or other leak in the system.

The inventors have observed that, at least when operating modules 20 as described above with a backwash flux as described herein, TMP during production is sensitive to the early stages of sludging, whereas TMP during backwashing is not. Without intending to be limited by theory, it requires a higher TMP to permeate water through the membranes in the early stages of sludging because the solids are compressed and physically block the water from reaching the membrane. During backwashing, the TMP is less affected because the solids are expanded. When there is no sludging, the solids are expanded and substantially removed during a backwash and TMP in the next permeation interval does not increase. When sludging is fully developed, the solids layer can be dewatered and TMP during backwash might also increase due to sludging as opposed to fouling. However, there appears to be a stage at the onset of sludging wherein the solids are pushed away from the membranes during backwashing but not substantially removed. These un-removed solids quickly reform a dense layer against the membrane surface at the start of the next permeation interval. If the onset of sludging is detected, the sludging can be corrected using a de-sludging procedure before it becomes fully developed. Monitoring for the onset of sludging thus allows a milder backwash to be used, because the risk of fully developed sludging is reduced.

An operator could alternatively choose a larger backwash flux such that sludging rarely or never occurs, but this would lower the recovery rate of the system and may physically damage the membranes or reduce their service life. With membrane sheets 10 described above, productive membrane surface area increases as the amount of bonding within a membrane sheet 10 decreases, and the undulating surface of the membrane sheets 10 appears to make them responsive to a de-sludging process. In at least this case, choosing a low backwash flux but monitoring for the onset of sludging is preferred over using a higher backwash flux.

The PLC continuously monitors the TMP during permeation intervals and backwash intervals (alternatively called production mode and backwash mode). The TMP is monitored within a moving time window, for example ranging from 1 hour to 1 week preceding the current time. The specific duration of monitoring window is a set point that is adjustable by the operator. Within each time window, the PLC may calculate and monitor a gap for each permeation interval between i) the TMP during the permeation interval, for example as recorded at one or more selected times within each permeation interval, and ii) the TMP during backwash, either the backwash preceding the permeation interval or the backwash following the permeation interval. Alternatively, the PLC may monitor the trend in the TMPs measured during the permeation intervals and the trend in the TMPs measured during the backwashes. In another option, the PLC may monitor both the gap and trends.

In an example, the operator enters set-points into the PLC for the duration of the moving window, a threshold value for TMP increase during production and a threshold value for TMP increase during backwashing. If the TMP during production for a module 20 increases by more than the threshold during the window, but the TMP during backwash for that module 20 does not increase by more than the threshold during the window, an alarm is triggered notifying the operator that the onset of sludging is likely occurring. At this time, the operator or the PCL may stop production mode and enter into an in situ de-sludging process for the module 20.

In further options with this example, if the PLC detects that both the TMP during production has increased by more than the threshold during the monitoring window, and the TMP during backwashes has also increased by more than the threshold during the monitoring window, an alarm is triggered notifying that fouling is likely occurring. In response to the alarm, the operator or the PLC may implement a de-fouling procedure, for example a chemical cleaning. If the PLC detects that TMP during backwash has increased by more than the threshold during the monitoring window, but TMP during production has not increased by more than the threshold, an alarm is triggered indicating that there may be air trapped in the permeate piping, or biological growth could be occurring in the permeate side of the system. The operator or the PLC may then implement a priming procedure wherein the system's air ejector will purge air from the permeate piping. When there is air in the permeate piping, no effect is shown on TMP during production. However, when the system is backwashing air can be forced into the membranes from the inside and block the path for water to be backwashed through the membranes. This causes the TMP during a backwash to increase.

Figure 12:
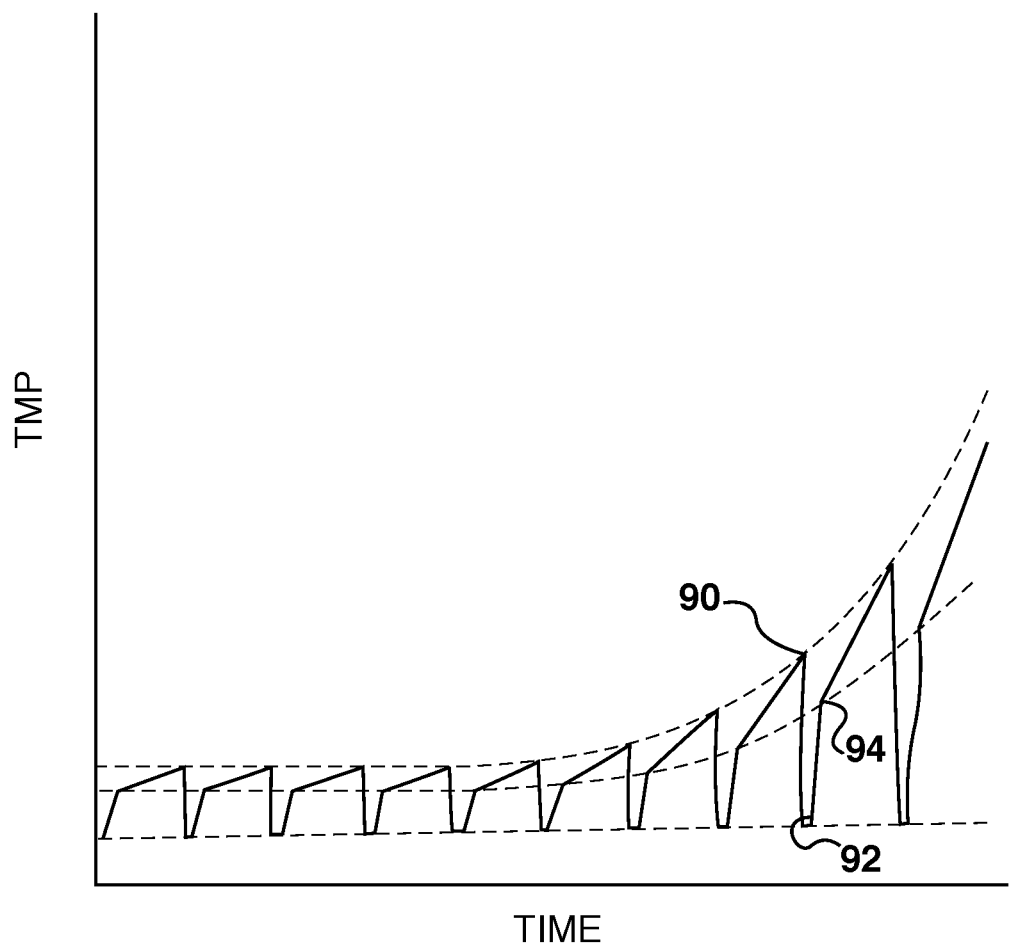
FIG. 12 is a graph of TMP over time for a module 20 that is beginning to sludge.

In another example, shown in FIG. 12, backwashing is done at about one third of the permeation flux. Since flux is constant during permeation (at least over the time period covered by FIG. 12) and constant (through at a different value) throughout the backwashing events, TMP shown in FIG. 12 is proportional to membrane permeability. The duration of the backwashing events in FIG. 12 relative to the permeation periods is exaggerated in FIG. 12 for the purposes of illustration.

For each backwashing event in FIG. 12, the TMP required to produce the preselected flux through the membranes is measured at time 90 before the backwash, time 92 during the backwash and time 94 after the backwash. TMP is recorded as its absolute value, i.e. regardless of the direction of flow. For each backwash, one or both of two differences are calculated, firstly the difference between TMP before and after backwash (i.e. 90-92) and secondly the difference between TMP during (for example in about the middle of) and after the backwash (i.e. 94-92). The after backwash TMP is preferably recorded a few seconds after permeation resumes, or when the TMP reading stabilizes, since the TMP immediately after backwash resumes may change rapidly and be dominated by transient conditions. In both cases, taking the absolute value of the difference allows for either TMP to be subtracted from the other or for permeability to be used in place of TMP even though permeability is inversely related to TMP.

In FIG. 12, the first five backwash events from the left indicate generally stable operation. Neither of the two differences mentioned above varies over a period of time (for example from one backwash to another or a longer period of time such as the five preceding permeation intervals) by more than a threshold amount, for example a threshold value in the range of 10-20% of an average value (for example averaged over the five preceding permeation intervals or a long term average), or by a threshold value in the range of 10-20% of the typical clean water permeability (or permeability during backwash) of the membrane. Depending on how the membranes are operated, other threshold values may be appropriate. The difference between TMP just after a backwash and TMP just before a backwash in the first 5 production intervals in FIG. 6 is exaggerated. During normal operation, there may be no material increase in TMP during a production interval. A rise in TMP during a production interval (or increase in the difference between before backwash TMP and during backwash TMP without a corresponding increase in the difference between after backwash TMP and during backwash TMP) can indicate that the process is approaching the critical flux (alternatively called critical flux). In this case, the average air flow rate during permeation may be increased to inhibit fouling.

The sixth and further backwashes suggest the onset of sludging in the module. This is indicated by one or both differences mentioned above exceeding the threshold amounts. Using both differences to indicate the onset of sludging helps reduce false positive indications, for example as caused by air accumulating on the permeate side of the membranes. Mathematically related indicators can also be used. Alternatively, the onset of sludging can be detected by visually observing trends in TMP or permeability over time or by providing mathematically similar analysis. For example, in FIG. 12, the onset of sludging is indicated by relatively sudden rises in one or both of the before and after backwash TMP while TMP during backwash remains relatively stable, as determined for example with a moving window as described above. Combinations of indicators may also be used. For example, the onset of sludging may be suggested by a rise beyond a threshold value in one of the differences described above during a moving window, but confirmed only if the rise in TMP during backwash in that window did not exceed the threshold value.

When the onset of sludging is detected, for example by any method described above, a de-sludging process is applied to the relevant modules 20. In the de-sludging process, permeation is stopped while aeration continues, preferably at an increased or maximum available rate. Depending on the operator's choice of set-points, which control how much sludging was allowed to accumulate, the de-sludging process may last for a short period of time, for example 1 to 5 minutes, or for a longer period of time, for example 5 minutes to one week, or for 1 hour to 24 hours. The de-sludging process dissipates solids starting to collect in the modules 20 before irreversible sludging occurs. The inventors believe that the modules 20 described above are particularly robust in that significant solids build-ups can be dissipated. However, it is expected that the method of detecting and reversing the onset of sludging can still be applied to other module designs with appropriate reductions in the threshold values, particularly if the backwash flux rate is not more than the production rate flux. The method might also be applied to modules operating with outside in flow in closed vessels.

I claim:

1. An aerator for an immersed membrane, the aerator having a horizontal part with an open bottomed cross section and outlet holes,
    wherein the outlet holes are more concentrated in a central third of the horizontal part than in either of the outer thirds of the horizontal part, and the aerator is supplied air from near two opposed ends of the aerator.

2. The aerator of claim 1 wherein the outlet holes in the central third of the horizontal part are higher than the outlet holes in the outer thirds of the horizontal part.

3. The aerator of claim 1 wherein the outlet holes in the central third of the horizontal part are higher than the outlet holes near the ends of the aerator.

4. The aerator of claim 1 wherein the outlet holes are spaced more closely together in a central third of the horizontal part than in either of the outer thirds of the horizontal part.

5. The aerator of claim 1 wherein the open bottomed cross section has an increasing width in a downward direction.

6. The aerator of claim 1 wherein the horizontal part has an open-bottomed triangular cross section.

7. An aerator for an immersed membrane, the aerator having a horizontal part with an open bottomed cross section and outlet holes, wherein the outlet holes are (i) more concentrated in a central third of the horizontal part than in either of the outer thirds of the horizontal part, or (ii) more concentrated in an outer third of the horizontal part than in a central third of the horizontal part, or (iii) more concentrated in an outer quarter of the horizontal part than in a central half of the horizontal part,
    wherein the more concentrated outlet holes are higher than outlet holes near ends of the aerator.

8. The aerator of claim 7 wherein the open bottomed cross section has an increasing width in a downward direction.

9. The aerator of claim 7 wherein the horizontal part has an open-bottomed triangular cross section.

10. The aerator of claim 7, wherein the aerator is supplied air from near two opposed ends of the aerator.

11. An aerator for an immersed membrane, the aerator having a horizontal part with an open bottomed cross section and outlet holes, wherein the outlet holes are (i) more concentrated in a central third of the horizontal part than in either of the outer thirds of the horizontal part, or (ii) more concentrated in an outer third of the horizontal part than in a central third of the horizontal part, or (iii) more concentrated in an outer quarter of the horizontal part than in a central half of the horizontal part, wherein all of the thirds or quarters of the horizontal part have outlet holes.

12. The aerator of claim 11 wherein the outlet holes in the central third of the horizontal part are higher than the outlet holes in the outer thirds of the horizontal part.

13. The aerator of claim 11 wherein the outlet holes in the central third of the horizontal part are higher than the outlet holes near the ends of the aerator.

14. The aerator of claim 11 wherein the outlet holes are spaced more closely together in a central third of the horizontal part than in either of the outer thirds of the horizontal part.

15. The aerator of claim 11 wherein the open bottomed cross section has an increasing width in a downward direction.

16. The aerator of claim 11 wherein the horizontal part has an open-bottomed triangular cross section.

17. The aerator of claim 11, wherein the aerator is supplied air from near two opposed ends of the aerator.

* * * * *